UNITED STATES PATENT OFFICE.

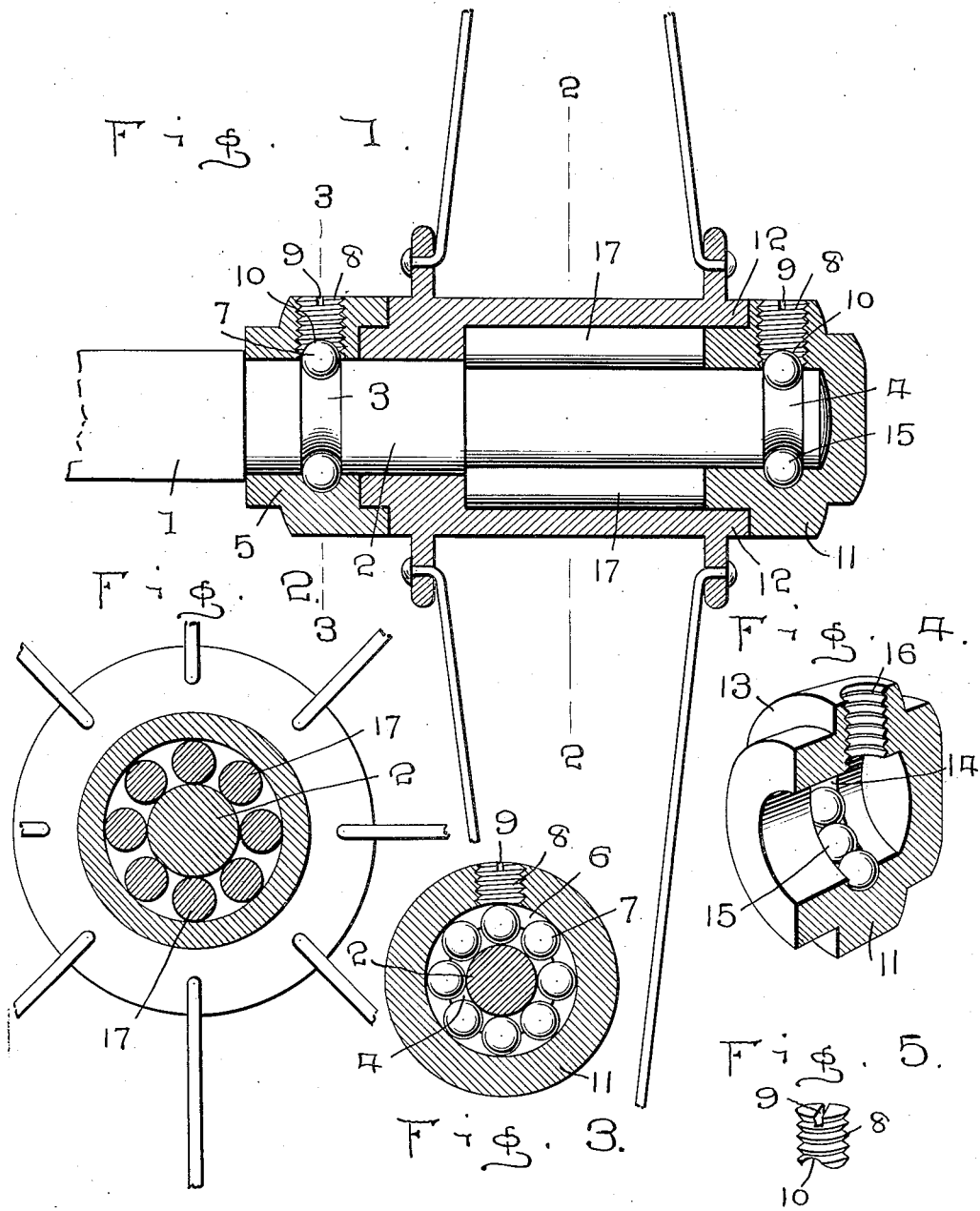

WILLIAM R. CLARKSON, OF TENINO, WASHINGTON.

BALL-BEARING RETAINING COLLAR AND CAP.

932,247.     Specification of Letters Patent.     Patented Aug. 24, 1909.

Application filed November 25, 1908. Serial No. 464,359.

*To all whom it may concern:*

Be it known that I, WILLIAM R. CLARKSON, a citizen of the United States, residing at Tenino, in the county of Thurston and State of Washington, have invented certain new and useful Improvements in Ball-Bearing Retaining Collars and Caps; and I do hereby declare the following to be a full, clear, and exact description of the invention, such as will enable others skilled in the art to which it appertains to make and use the same.

My object is to provide a new method or means for utilizing ball bearings upon shafts, and vehicle axles and the like, and my invention consists of certain novel features of construction and combination of parts, the preferred form whereof, will be hereinafter fully set forth and pointed out in the claim.

In the accompanying drawings made a part of this application, I have shown my invention as applied to use upon the axle of a vehicle, it being understood that my invention may be found equally efficient for holding a wheel upon its shaft or bearings with a minimum amount of friction.

Referring to the drawings, Figure 1 shows a longitudinal section of a vehicle wheel provided both with my anti-friction roller and ball bearings. Fig. 2 is a transverse sectional view of Fig. 1 on line 2—2 thereof. Fig. 3 is a similar view of Fig. 1 taken on line 3—3. Fig. 4 is a perspective detail view of my ball-bearing retaining cap. Fig. 5 is a detail view showing the set screw or plug properly shaped on its inner end to retain balls in their operative positions.

The various details of my invention and coöperating accessories, will for convenience, be designated by numerals, the same numeral applying to a corresponding part in the several views.

It will be observed that I have shown a portion of the axle 1, which may be of any preferred construction, and is provided upon its outer end with the journal proper, or spindle 2, of the usual or any preferred form, said spindle having the inner and outer circumferential grooves 3 and 4 respectively. Designed to coöperate with the groove 3 is the rotatable collar 5 taking the place of the ordinary fixed abutment for the inner end of the wheel. The said collar 5 is provided with the internal groove 6, more clearly illustrated in Fig. 3, the said grooves 3 and 6 being designed to complement each other, and thus provide a seat for the plurality of anti-friction balls 7. It is important however to provide means for introducing said balls in place within the said complementary grooves 3 and 6, and I accomplish this by means of an opening leading directly into the groove 6, and provided with a set screw or plug 8 of the form illustrated in Fig. 5, wherein it will be observed that the outer end of said screw or plug 8, is provided with a cleft 9, while the inner end thereof is formed with a concave face 10, thereby insuring that when said plug is turned home in its seat, the said groove 10 will form a continuation of the groove 6. In like manner, I provide for the outer end of the axle, the retaining cap 11 being open on its inner end to receive the outer end of the spindle, and at the same time fit within the end of the hub 12, as shown in Fig. 1, a shoulder 13 being also formed to fit against the outer end of the hub 12 to insure a perfect dust-proof joint.

By reference to Figs. 1 and 4, it will be observed that I have provided a groove 14 on the inner face of the opening in the cap 11, said groove being so located and formed that it will register with said groove 4 in the spindle, thereby providing a complete annular seat for the anti-friction balls 15. In order to introduce said balls, I form an opening leading into the groove 14, said opening being internally threaded as indicated by the numeral 16, and designed to receive the plug 8, thereby securely locking the anti-friction balls 15 within their seat, and consequently locking the wheel in position upon the spindle without the need of the usual nut commonly located on the end of the spindle for this purpose. In order to provide a more perfect bearing for the wheel proper, I utilize the anti-friction rollers 17, as shown in Figs. 1 and 2.

While I have shown my invention as applied to use upon the spindle or axle of a vehicle, it will be obvious that my means for utilizing the ball-bearing principle, will be equally desirable and reliably efficient for providing anti-friction collars upon various kinds of shafts of machinery.

One of the many advantages arising from the use of my invention when applied to use, as hereinbefore described, is in making it possible to wholly dispense with the retaining nut upon the outer end of the axle, inasmuch as my retaining cap 11, not only securely holds the wheel in position by means of the location of the anti-friction balls within the complementary grooves 4 and 14, but I also render the end of the spindle and the bearings for the hub, wholly dust-proof. When it is desired to remove the wheel from the spindle, all that is necessary, is to withdraw the retaining plug 8 from its seat, and turn the opening downward when the several balls will drop out into the hand of the operator, thus making it possible to remove the retaining cap 11, and also the wheel from its seat upon the spindle. By the means which I have provided, it will be observed that both ends of the hub are placed in contact with a yielding collar, each of which is thus left free to easily turn in either direction, thereby reducing the friction to a minimum.

What I claim is:

A device of the character described, comprising an axle, a hub receiving said axle, a collar applied to said axle and interposed between said hub and shoulder of said axle, a cap applied to the end of said axle and engaging the outer end of said hub, said cap having rotatable connection with said axle, said hub having an annular chamber enlargement and said axle having an annular reduction, bearing rollers received by said annular chamber enlargement and said annular reduction, said axle having annular grooves therein near its ends and said cap and collar having also annular grooves complementing the aforesaid grooves respectively and bearing balls arranged in the races formed by said annular grooves.

In testimony whereof I have signed my name to this specification in the presence of two subscribing witnesses.

WILLIAM R. CLARKSON.

Witnesses:
W. E. WRIGHT,
G. BIRCKHEAD.